United States Patent Office 3,137,559
Patented June 16, 1964

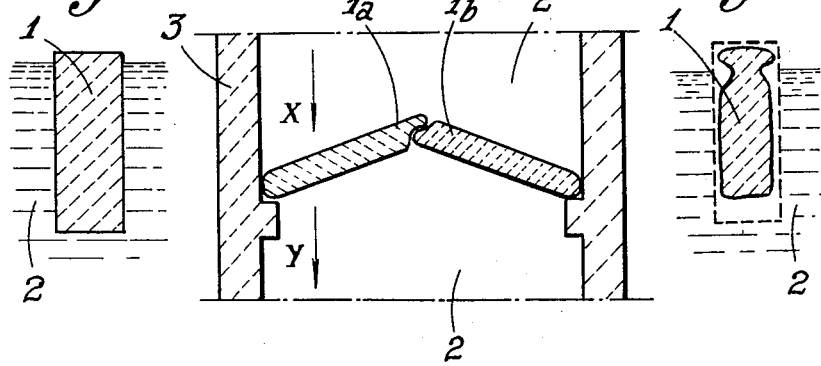
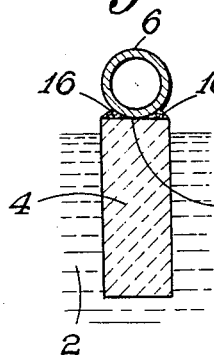
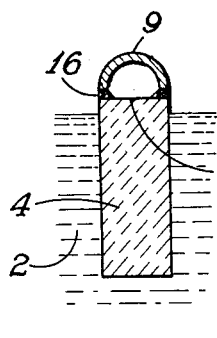
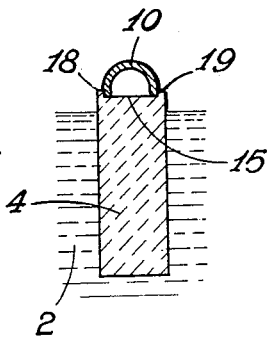
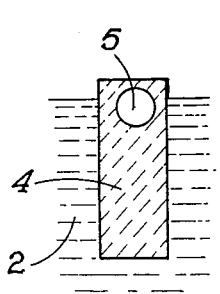
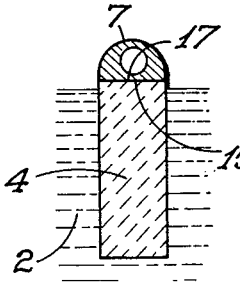
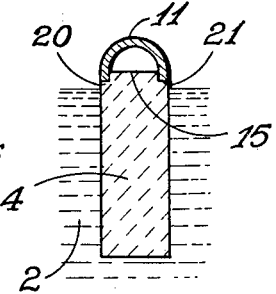

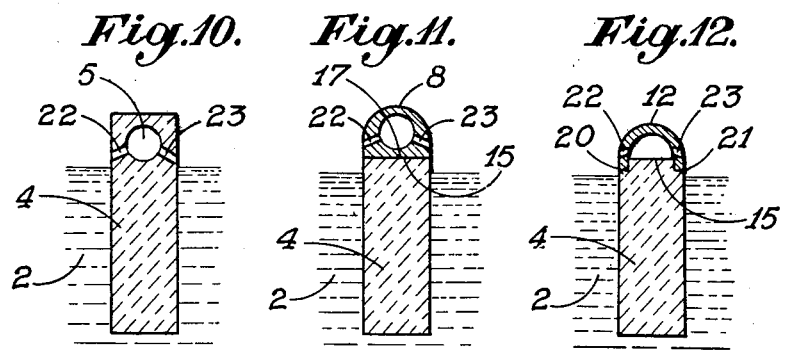
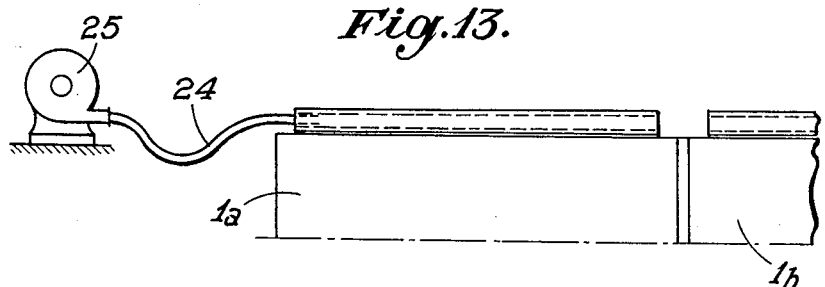
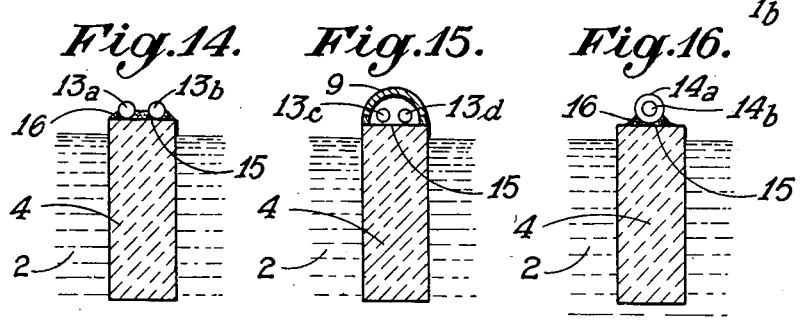
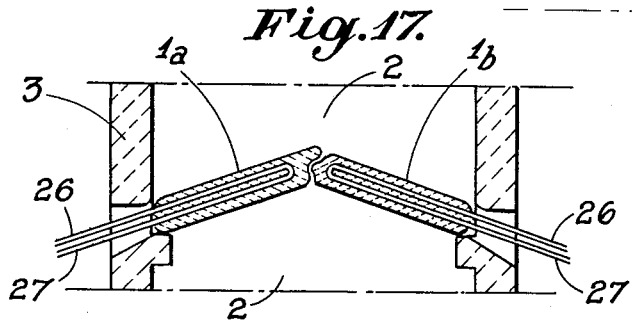

3,137,559
DEVICE FOR THE PROTECTION OF FLOATS
IN GLASS MAKING
Alphonse Van Praet, Zeebrugge, Belgium, assignor to Union des Verreries Mecaniques Belges, Charleroi, Belgium, a Belgian company
Filed Oct. 26, 1959, Ser. No. 848,723
Claims priority, application Netherlands Nov. 19, 1958
5 Claims. (Cl. 65—343)

The present invention relates to a method of and a device for the protection of floats in glass making.

Such floats, which are also called barriers, are members consisting of refractory material, which are disposed in glass making tanks to act on the streams of glass, and which float on the bath of molten glass in such manner that their upper face emerges several centimetres above the surface of the bath. Floats generally consist of two parts buttressed against the walls of the tank of the furnace in such manner that the surface glass stream maintains them automatically in position (see FIGURES 1 and 2 of the accompanying drawings).

These members are subjected to extremely severe operating conditions due to the high temperatures in the refining zone, to the atmosphere charged with corrosive dust acting on the non-immersed part of the floats, and to the corrosive action of the glass and of the unmelted starting materials which may sometimes reach them. An erosion effect is sometimes produced by the glass streams.

The resistance of floats to erosion and more especially to corrosion is lower as the temperature is higher. The effect of these phenomena is such that floats consisting of high-quality refractory earth must generally be replaced after having been in service for several weeks. When they are withdrawn from the furnace, the height has generally decreased by 25% to 50%, the edges of their upper portion (non-immersed part) have been rounded to a considerable extent and the level of glass is marked by a wide notch in each of their vertical faces (see FIGURE 3).

The material thus removed from the floats has therefore been carried away by the glass, one part having been digested by the latter, while the rest remains in the form of grains which are to be found in the finished product.

These two parts of material removed from the floats are harmful to the manufacture of glass because, whether or not they are digested by the latter, they do not diffuse sufficiently in the glass to form a homogeneous mixture therewith. They are therefore always to be found in the form of heterogeneities in the product, namely in the form of grains or strings, undulations, striations, etc., which impair the quality thereof.

According to the invention, these disadvantages are obviated by subjecting the floats to an appropriate cooling in such manner as to reduce their own temperature and thus to increase their resistance, both to erosion and to corrosion.

The cooling of the floats which is carried out in accordance with the invention affords further advantages which will be apparent from the following description.

The accompanying drawings illustrate diagrammatically, on the one hand, floats of a known kind, and on the other hand a number of embodiments of the invention, viz., FIGURES 1 to 3, already described in the foregoing, respectively a vertical sectional view of a new float 1 of a known type floating on the glass bath 2, a plan view of a pair of floats 1a, 1b floating on the glass bath 2 in the refining zone of the tank 3 of the furnace, the direction of the surface current of the bath being indicated by the arrows x, y, and a vertical sectional view similar to that of FIGURE 1 through a used float of known type.

FIGURES 4 to 12 vertical sectional views of various constructional forms of floats according to the invention, FIGURE 13 is a fragmentary view in side elevation of a pair of floats according to FIGURE 4, and of a blowing device associated therewith, FIGURES 14 to 16 vertical sectional views of three other constructional forms of floats according to the invention, and FIGURE 17 a plan view of a pair of floats according to FIGURE 15 in the refining zone of the furnace.

In a particularly advantageous embodiment of the invention, which is the one illustrated in FIGURES 4 to 17, appropriate cooling is applied to the upper part of the floats.

In accordance with the embodiments illustrated in FIGURES 4 to 13, this cooling is effected with the aid of a cooling gas, for example circulating air, while in accordance with the embodiments illustrated in FIGURES 14 to 17 the cooling is effected by hydraulic means, for example by means of circulating water.

In all these examples, the body 4 of each float is provided in its upper part with at least one duct intended to receive circulating fluid. The said duct can be formed directly in the upper part of the body 4 of each float, for example as illustrated at 5 in FIGURES 7 and 10, or it may consist of a tube 6, 7 and 8 respectively consisting of one or more parts (FIGURES 4, 8 and 11), or again by a tube section, for example a half-tube 9, 10, 11 and 12 respectively obtained by sewing a tube, for example of circular section, along a diametral plane (FIGURES 5, 6, 7, 9 and 12 respectively) or again by a number of tubes or a number of tube branches having opposite directions or a single direction of circulation, which are disposed side by side, for example by hairpin-shaped tubes 13a, 13b . . . (FIGURES 14 and 15), or by tubes 14a, 14b (FIGURE 16) disposed concentrically one within the other, or by a combination of tubes 13c, 13d with at least one protective half-tube, for example 9 (FIGURE 15).

In the embodiments illustrated in FIGURES 4 to 6, 8, 9, 11, 12 and 14 to 16, the tube or tubes are disposed longitudinally on the upper face 15 of each float and may be connected thereto, for example, by a joint 16 formed of cement or appropriate refractory earth (see FIGURES 4, 5, 14 and 16) which impart maximum thermal conductivity to the assembly so that the cooling fluid circulating in the said tubes exerts its cooling action both upon the latter and upon the head of the float, which is the part most exposed to the unfavourable physical and chemical conditions.

In the embodiments illustrated in FIGURES 8 and 11, the tube 7, 8 may have a plane outer face 17 which enables it to be mounted, for example without any auxiliary securing means, on the upper, simply plane surface 15 of the float.

In the embodiments illustrated in FIGURES 6, 9 and 12, the stability with which the half-tube 10, 11, 12 is retained by the upper surface 15 of the float is increased either by lowering the centre portion of the surface 15 of the float in such manner as to define lateral longitudinal ribs 18, 19 on the upper part of the body of the float (FIGURE 6), between which is disposed the corresponding lower part of the half-tube 10, or by raising the centre part of the surface 15 in such manner as to define lateral longitudinal grooves 20, 21 in the upper part or head of the body of the float (FIGURES 9, 12), in which are disposed the corresponding lower parts of the half-tube 11, 12.

In the embodiments illustrated in FIGURES 10, 11 and 12, the duct or tube 5, 8, 12 carrying the cooling fluid along the head of the float is formed with a series of lateral apertures 22, 23 situated at intervals in such manner as to direct a portion of the fluid on to the surface of the glass bath and/or on to the lateral faces of the float at the level of the glass bath, in order to cool, on the one hand, the glass and thus to deal both with the currents and with the aggressive action of the glass, and on the other hand those parts of the floats in which recesses (FIGURE 3) tend to form and thus to increase the resistance of the float to erosion and to corrosion.

In the case of the embodiments illustrated in FIGURES 4 to 13, the ducts or tubes open at one or both ends are connected by an intermediate conduit 24 (FIGURE 13), which may extend into the duct or tube under consideration to an appropriate depth, to a source of gaseous cooling fluid, for example a fan 25 supplying air at a predetermined pressure, that is to say, at a pressure slightly higher than that existing in the furnace, for example in the refining zone.

In the case of the embodiments of FIGURES 14 to 17, the two branches 13a, 13b or 13c, 13d of the hairpin tubes (FIGURES 14 and 15), or the corresponding ends of the concentric tubes 14a, 14b (FIGURE 16) are connected by intermediate conduits 26, 27 one to the point of admission and the other to the point of discharge of the cooling liquid, for example water.

The embodiments of the invention as hereinbefore described permit not only of cooling the head of the float and, to a smaller extent, the body thereof, but also of protecting its upper face against the radiation of heat from the laboratory and from the arches of the furnace, whereby its heating is reduced.

The tubes or half-tubes employed in the embodiment of FIGURES 4 to 6, 8, 9, 11 and 12, as also the half-tube of FIGURE 15, may be constructed, for example, of refractory earth identical to that of which the floats are constructed, or of any other appropriate refractory material. In this case, they constitute wear elements which become worn instead of the float—and therefore more rapidly than the latter—and can be periodically replaced.

According to the invention, the tube may consist of another particularly resistant material, for example of electrocast material of silico-aluminous, aluminous or other nature which by reason of its low weight, may be of substantially higher cost while nevertheless providing an economic assembly by reason of the considerable increase in the useful life of the floats.

The tubes 13a, 13b, 13c, 13d, 14a and 14b (FIGURES 14 to 17) may in turn consist of steel or of any other appropriate refractory material. Instead of being protected by virtue of their positioning below a protective half-tube of refractory material (FIGURE 15), they may be covered by a protective refractory coating or with a coating possessing a high reflecting power in infra-red (not shown) which coating may consist of for example, an appropriate ceramic material.

The greater part of the cooling effect will thus be applied to the protection of the floats.

The positioning of the cooling tubes and/or half-tubes will generally be effected when the floats themselves are in their final position. The introduction of the half-tubes will thus be easier.

I claim:

1. In a glass working apparatus, a furnace tank containing a flowing stream of molten glass, a barrier member for such stream supported in floating condition by such molten glass and disposed therein in transverse relation to the direction of flow of such molten glass stream and with the upper end thereof extending above the surface of the molten glass, said barrier member being composed of refractory material subject to the corrosive action of the molten glass and of the atmosphere in the furnace and having a density less than that of the molten glass so that said barrier member is a self-floating unit capable of floating upright in the molten glass with its upper end portion projecting above the level of the molten glass, and means for protecting the refractory material in the upper part of said self-floating member against attack by the molten glass and furnace atmosphere, said means comprising a passageway for a cooling fluid extending longitudinally through the upper end portion of the barrier member projecting above the level of the molten glass to enable the cooling fluid to cool the upper part of the barrier member above a line substantially below the level of the molten glass, and means for providing in said passageway a cooling fluid capable of cooling such upper part of said self-floating barrier member to protect the upper end portion of such member projecting above the level of the molten glass against the furnace atmosphere, to protect the portion of such upper part thereof submerged in the molten glass against such molten glass, and to protect such barrier member at the level of the molten glass against the action of the molten glass stream thereon.

2. Apparatus such as defined in claim 1, in which the upper longitudinal portion at least of the wall of said passageway is constituted of a preformed section mounted on the body of said barrier member, and means for retaining said preformed section on the upper end of the body of said barrier member.

3. Apparatus such as defined in claim 1, in which a longitudinal portion, at least, of the wall of said passageway is composed of a material having a density substantially greater than said refractory material.

4. Apparatus such as defined in claim 1, in which the wall of said fluid passageway is provided with a plurality of lateral openings arranged to direct cooling fluid from said passageway upon surface portions of said self-floating member located above the level of the glass bath.

5. Apparatus such as defined in claim 1, in which the wall of said fluid passageway is provided with a plurality of lateral openings arranged to divert cooling fluid from said passageway upon surface portions of the glass bath in the neighborhood of said self-floating member.

References Cited in the file of this patent

UNITED STATES PATENTS

| | | |
|---|---|---|
| 750,253 | Byrnes | Jan. 26, 1904 |
| 1,322,767 | Vaughn | Nov. 25, 1919 |
| 1,558,986 | Jones | Oct. 27, 1925 |
| 1,581,338 | Ferngren | Apr. 20, 1926 |
| 1,636,151 | Shaw | July 19, 1927 |
| 1,656,103 | Drake | Jan. 10, 1928 |
| 1,679,295 | Dodge | July 31, 1928 |
| 1,835,690 | Bowman | Dec. 8, 1931 |
| 1,875,474 | McKinley | Sept. 6, 1932 |
| 1,879,718 | Soubier | Sept. 27, 1932 |
| 1,906,695 | Lufkin | May 2, 1933 |
| 1,920,692 | Halbach | Aug. 1, 1933 |
| 2,049,600 | Wright | Aug. 4, 1936 |
| 2,053,902 | Forter | Sept. 8, 1936 |
| 2,064,546 | Kutchka | Dec. 15, 1936 |
| 2,078,795 | Forter | Apr. 27, 1937 |
| 2,478,090 | Devol | Aug. 2, 1949 |
| 2,508,222 | Cannon | May 16, 1950 |
| 2,694,272 | Spengler | Nov. 16, 1954 |